(12) United States Patent
Ko et al.

(10) Patent No.: US 9,833,751 B2
(45) Date of Patent: Dec. 5, 2017

(54) POLYAMIDE WATER-TREATMENT SEPARATION MEMBRANE HAVING SUPERIOR OXIDATION RESISTANCE AND CHLORINE RESISTANCE PROPERTIES, AND METHOD OF MANUFACTURING THE SAME

(71) Applicant: LG CHEM, LTD., Seoul (KR)

(72) Inventors: Young-Hoon Ko, Daejeon (KR); Jae-Hong Kim, Daejeon (KR); Keun-Won Song, Daejeon (KR); Chong-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 473 days.

(21) Appl. No.: 14/387,470

(22) PCT Filed: Jun. 5, 2014

(86) PCT No.: PCT/KR2014/005023
§ 371 (c)(1),
(2) Date: Sep. 23, 2014

(87) PCT Pub. No.: WO2014/196835
PCT Pub. Date: Dec. 11, 2014

(65) Prior Publication Data
US 2015/0375178 A1    Dec. 31, 2015

(30) Foreign Application Priority Data

Jun. 7, 2013  (KR) .................... 10-2013-0065439
Jun. 5, 2014  (KR) .................... 10-2014-0068409

(51) Int. Cl.
| | | |
|---|---|---|
| B01D 71/56 | (2006.01) | |
| B01D 69/02 | (2006.01) | |
| B01D 67/00 | (2006.01) | |
| B01D 69/12 | (2006.01) | |
| B01D 69/14 | (2006.01) | |

(52) U.S. Cl.
CPC ......... *B01D 71/56* (2013.01); *B01D 67/0006* (2013.01); *B01D 69/02* (2013.01); *B01D 69/125* (2013.01); *B01D 69/141* (2013.01); *B01D 2325/28* (2013.01); *B01D 2325/30* (2013.01)

(58) Field of Classification Search
None
See application file for complete search history.

(56) References Cited

U.S. PATENT DOCUMENTS

| | | | | |
|---|---|---|---|---|
| 5,256,718 | A  * | 10/1993 | Yamamoto ........... | C08K 3/2279 524/120 |
| 2003/0159984 | A1 | 8/2003 | Wechs | |
| 2006/0252857 | A1* | 11/2006 | Schafer ................ | C07D 251/22 524/100 |
| 2007/0284309 | A1 | 12/2007 | Tomioka | |
| 2008/0312349 | A1 | 12/2008 | Yeager et al. | |
| 2009/0255226 | A1* | 10/2009 | Kohli .................. | B01D 39/1623 55/379 |
| 2010/0190950 | A1* | 7/2010 | Tetsuka .................. | B01D 71/44 528/15 |
| 2013/0139691 | A1 | 6/2013 | Goldbach | |
| 2014/0142213 | A1 | 5/2014 | Weiss et al. | |

FOREIGN PATENT DOCUMENTS

| | | | | |
|---|---|---|---|---|
| DE | 10-2010-034700 | A1 | 2/2012 | |
| EP | 2722101 | A2 | 4/2014 | |
| JP | 7-268209 | A1 | 10/1995 | |
| JP | 2011104946 | A | 6/2011 | |
| JP | 2011200863 | A | 10/2011 | |
| JP | 2013503124 | A | 1/2013 | |
| JP | 2005186059 | A | 7/2015 | |
| KR | 10-2007-0085522 | A | 8/2007 | |
| WO | 2001-078882 | A2 | 10/2001 | |
| WO | 2001-093994 | A1 | 12/2001 | |
| WO | WO 2004106311 | A2 * | 12/2004 | ........... C07D 251/22 |
| WO | 2006-051888 | A1 | 5/2006 | |
| WO | 2012-022406 | A1 | 2/2012 | |
| WO | 2012173417 | A2 | 12/2012 | |
| WO | 2013-057492 | A1 | 4/2013 | |

OTHER PUBLICATIONS

Irganox 1010.pdf—Irganox 1010 fact sheet—Ciba, 1998.*

* cited by examiner

*Primary Examiner* — Krishnan S Menon
*Assistant Examiner* — Bradley R Spies
(74) *Attorney, Agent, or Firm* — Dentons US LLP

(57) ABSTRACT

The present disclosure relates to a water-treatment separation membrane including: a porous support and a polyamide layer formed on the porous support, wherein the polyamide layer contains an antioxidant having a solubility parameter value of 9 $(J/cm^3)^{1/2}$ to 22 $(J/cm^3)^{1/2}$, and a method of manufacturing the same.

10 Claims, No Drawings

POLYAMIDE WATER-TREATMENT SEPARATION MEMBRANE HAVING SUPERIOR OXIDATION RESISTANCE AND CHLORINE RESISTANCE PROPERTIES, AND METHOD OF MANUFACTURING THE SAME

This application is a National Stage entry of International Application No. PCT/KR2014/005023, filed on Jun. 5, 2014, which claims priority to Korean Patent Application Nos. 10-2013-0065439, filed on Jun. 7, 2013 and 10-2014-0068409, filed on Jun. 5, 2014, with the Korean Intellectual Property Office, all of which are incorporated herein in their entirety by reference.

TECHNICAL FIELD

The present disclosure relates to a polyamide water-treatment separation membrane and a method of manufacturing the same, and more particularly, to a polyamide water-treatment separation membrane having improved oxidation resistance and chorine resistance properties by including an antioxidant in a polyamide layer, and a method of manufacturing the same.

BACKGROUND ART

Recently, the development of novel water resource supply sources has come to the fore as an urgent issue due to severe levels of water contamination and water shortages worldwide. Research into the contamination of water is aimed at processing water for domestic, commercial and industrial uses, various types of domestic sewage, industrial waste water and the like. Water-treatment processes, using separation membranes having advantages in terms of energy savings, for example, have come to prominence. Further, the enforcement of environmental regulations increasing in recent times, may allow for the advanced activation of separation membrane technologies. In meeting the requirements of such environmental regulations, traditional water-treatment processes may be insufficient; however, since separation membrane technologies may ensure superior processing efficiency and stable treatment processes, they are expected to become leading technologies in the field of water treatment going into the future.

Liquid separation methods may be classified as a micro-filtration method, an ultra-filtration method, a nano-filtration method, a reverse osmosis method, a stannizing method, an active transportation method, an electrodialysis method and the like. Among these methods, the reverse osmosis method may be a desalinization process using a semipermeable membrane enabling water to penetrate therethrough while not allowing salts to penetrate therethrough. When high pressure water in which salts are dissolved is introduced to one surface of the semipermeable membrane, de-ionized water from which salts are removed may be discharged through the other surface of the semipermeable membrane at low pressure.

Lately, worldwide, about a billion gallons of water are subjected to a desalinization process through a reverse osmosis method every day. Since the first desalinization process using reverse osmosis was disclosed in the 1930s, a considerable amount of research into semipermeable membrane materials has been conducted in the field thereof. Here, research into asymmetric cellulose membranes and polyamide composite membranes has become prominent in terms of commercial viability. Since cellulose membranes developed in the early stage of reverse osmosis membrane technological development may be disadvantageous in that they have relatively narrow operable Ph ranges, are easily deformed at high temperatures, require high operational costs due to the use of high pressure and are vulnerable to microbes, they have been rarely used in recent times.

Meanwhile, a polyamide composite membrane may be prepared by forming a polysulfone layer on a non-woven fabric to form a microporous support, dipping the microporous support in an aqueous m-phenylene diamine (mPD) solution to form an mPD layer, and dipping or coating the mPD layer in or with an organic trimesoyl chloride (TMC) solvent to allow the mPD layer to be brought into contact with the TMC so as to be interfacially polymerized to thereby form a polyamide layer. A non-polar solution and a polar solution may come into contact with each other, whereby the polymerization may only be generated in the interface to form a polyamide layer having a significantly small thickness. Since polyamide composite membranes have high levels of stability with respect to pH variations, are operatable under low degrees of pressure, and have superior salt rejection rates, as compared to existing asymmetric cellulose membranes, they are now mainly provided as water-treatment separation membranes.

However, the polyamide composite membranes have defects in that the replacement period of the membranes is relatively short, because a reduction ratio in chlorine resistance over time is high. Thus, in order to lower the reduction ratio in chlorine resistance of water-treatment separation membranes, a method of increasing a specific surface area of an active layer thereof has been suggested. Specifically, a technology of forming an active layer such that a specific surface area of a skin layer of the water-treatment separation membrane is large, and subsequently, dipping the active layer into an acid solution to form a surface of the skin layer to be uneven or to form wrinkles in the layer has been disclosed. Also, a method of fabricating a reverse osmosis composite membrane and subsequently, performing post-processing on the membrane with strong acid to thereby increase surface roughness has been disclosed.

However, in a case in which a separation membrane provided with an active layer is dipped in an acid solution, a surface of the separation membrane may have a negative charge, such that contaminant materials having positive charges may be attached to the separation membrane to cause a decrease in transmittance of the separation membrane. Accordingly, a separate post-processing process of coating the surface of the separation membrane with electrically neutral polymers needs to be undertaken.

Further, polyamide separation membranes according to the related art are significantly sensitive to oxidizing materials, and the oxidizing materials may remarkably deteriorate functions of the membranes with only a low concentration and may rapidly reduce the salt rejection rate. As the majority of water resources worldwide are contaminated, the water resources may be acid-treated wastewater and water treated by a separation membrane may contain a great quantity of disinfectant at all times. Consequently, the lifespan of the related art separation membrane used in processing such water may be short and it may be necessary to frequently replace the separation membrane. Thus, membrane efficiency may be decreased while costs required for treatment may be increased.

DISCLOSURE

Technical Problem

An aspect of the present disclosure provides a polyamide water-treatment separation membrane having superior oxidation resistance and chorine resistance properties by performing polymerization of a polyamide layer through the introduction of an antioxidant to an organic solution containing an acyl halide compound.

Technical Solution

According to an aspect of the present disclosure, there is provided a water-treatment separation membrane including: (1) a porous support and (2) a polyamide layer formed on the porous support, (3) wherein the polyamide layer contains an antioxidant having a solubility parameter value of 9 $(J/cm^3)^{1/2}$ to 22 $(J/cm^3)^{1/2}$.

The antioxidant may be a phenol antioxidant, an amine antioxidant, a phosphorus antioxidant, a sulfur antioxidant, or combinations thereof.

The phenol antioxidant may be selected from among compounds represented by the following Chemical Formulae 1 and 2:

[Chemical Formula 1]

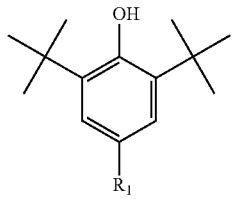

where $R_1$ is a $C_1$ to $C_{20}$ alkyl group,

[Chemical Formula 2]

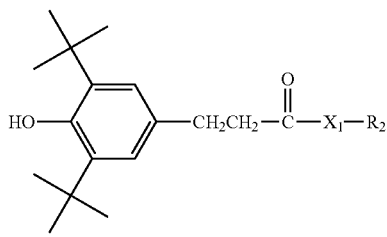

where $R_2$ is a $C_1$ to $C_{20}$ alkyl group,

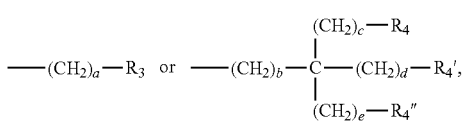

wherein a, b, c, d, and e are each independently an integer of 1 to 10, and $R_3$, $R_4$, $R_4'$ and $R_4''$ are each independently a substance having a structure represented by the following Chemical Formula 3:

[Chemical Formula 3]

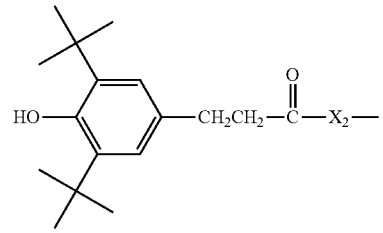

where, $X_1$ and $X_2$ are each independently —O— or —N—.

The phosphorus antioxidant may be selected from among compounds represented by the following Chemical Formulae 4 and 5:

[Chemical Formula 4]

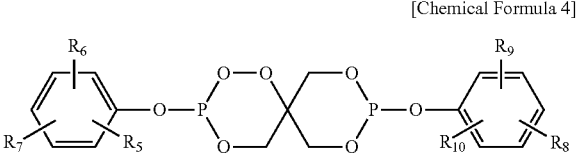

where $R_5$ to $R_{10}$ each independently represents a hydrogen atom or a $C_1$ to $C_9$ alkyl group,

[Chemical Formula 5]

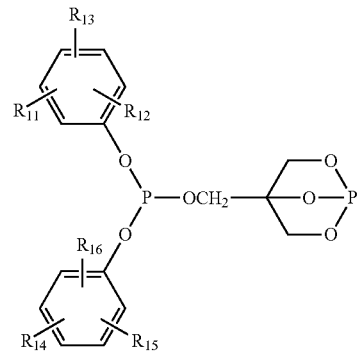

where $R_{11}$ to $R_{16}$ each independently represents a hydrogen atom or a $C_1$ to $C_9$ alkyl group.

The polyamide active layer may be formed by bringing an aqueous solution containing an amine compound into contact with an organic solution containing an acyl halide compound to allow for an interfacial polymerization, and the antioxidant may be contained in an amount of 0.02 to 5 parts by weight based on 100 parts by weight of a solid content of the acyl halide compound contained in the organic solution.

A salt rejection rate of the water-treatment separation membrane after being immersed in de-ionized water for 14 days may be 99.10% or more. A salt rejection rate of the water-treatment separation membrane after being stored under light-tight conditions for 16 days may be 98.50% or more. A salt rejection rate of the water-treatment separation membrane after allowing a mixed aqueous solution containing an aqueous sodium chloride solution at a concentration of 32,000 ppm and sodium hypochlorite at a concentration of 2,000 ppm to pass through the water-treatment separation membrane for 12 hours may be 98.50% or more.

Variations in a salt rejection rate of the water-treatment separation membrane after allowing a mixed aqueous solution containing an aqueous sodium chloride solution at a concentration of 32,000 ppm and sodium hypochlorite at a concentration of 2,000 ppm to pass through the water-treatment separation membrane for 12 hours may be 0.5% or less, as compared to an initial salt rejection rate of the water-treatment separation membrane. variations in a permeate flux of the water-treatment separation membrane after allowing a mixed aqueous solution containing an aqueous sodium chloride solution at a concentration of 32,000 ppm and sodium hypochlorite at a concentration of 2,000 ppm to pass through the water-treatment separation membrane for 12 hours may be 10% or less, as compared to an initial permeate flux of the water-treatment separation membrane.

According to another aspect of the present disclosure, there are provided a water-treatment module including at least one water-treatment separation membrane as described above and a water-treatment device including at least one water-treatment module as described above.

According to another aspect of the present disclosure, there is provided a method of manufacturing a water-treatment separation membrane, the method including: forming an aqueous solution layer containing an amine compound on a porous support; and forming a polyamide layer by bringing an organic solution containing an acyl halide compound and an antioxidant having a solubility parameter value of 9 $(J/cm^3)^{1/2}$ to 22 $(J/cm^3)^{1/2}$ into contact with the aqueous solution layer.

The antioxidant may be contained in an amount of 0.02 to 5 parts by weight based on 100 parts by weight of a solid content of the acyl halide compound contained in the organic solution.

Advantageous Effects

The water-treatment separation membrane according an exemplary embodiment of the present disclosure may have superior oxidation resistance and chorine resistance properties by containing an antioxidant having a solubility parameter value of 9 $(J/cm^3)^{1/2}$ to 22 $(J/cm^3)^{1/2}$ in a polyamide layer.

Further, in the method of manufacturing a water-treatment separation membrane according to an exemplary embodiment of the present disclosure, a water-treatment separation membrane having superior oxidation resistance and chorine resistance properties may be manufactured by performing polymerization of a polyamide layer through the introduction of an antioxidant to an organic solution containing an acyl halide compound, without a separate post-processing process.

BEST MODE

Hereinafter, exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As a result of repeated research undertaken in order to develop a water-treatment separation membrane having superior oxidation resistance and chorine resistance properties while not deteriorating water purifying functions, the inventors of the present disclosure found that the above-described objects could be achieved by containing an antioxidant in a polyamide layer, and completed the present disclosure.

A water-treatment separation membrane according to an exemplary embodiment of the present disclosure relates to a water-treatment separation membrane including (1) a porous support and (2) a polyamide layer formed on the porous support, and (3) the polyamide layer contains an antioxidant having a solubility parameter value of 9 $(J/cm^3)^{1/2}$ to 22 $(J/cm^3)^{1/2}$.

(1) The porous support may be formed by coating a polymer material on a non-woven fabric and examples of the polymer material may include polysulfone, polyether sulfone, polycarbonate, polyethylene oxide, polyimide, polyether imide, polyether ether ketone, polypropylene, polymethylpentene, polymethylchloride, polyvinylidene fluoride, and the like, but are not limited thereto. Among these, the polymer material may be, particularly, polysulfone.

Meanwhile, (2) the polyamide layer formed on the porous support may be formed by an interfacial polymerization of an amine compound and an acyl halide compound. Specifically, after coating an aqueous solution containing the amine compound on a porous support to form a layer, the layer is brought into contact with an organic solution containing the acyl halide compound to thereby form the polyamide layer.

In this case, the amine compound is not limited, but may be, for example, m-phenylenediamine, p-phenylenediamine, 1,3,6-benzene triamine, 4-chloro-1,3-phenylenediamine, 6-chloro-1,3-phenylenediamine, 3-chloro-1,4-phenylenediamine or combinations thereof. In addition, the acyl halide compound, an aromatic compound having two to three carboxylic acid halides, may be, for example, trimesoyl chloride, isophthaloyl chloride, terephthaloyl chloride or a combination thereof, but is not limited thereto.

Next, (3) the polyamide layer of the water-treatment separation membrane according to an exemplary embodiment of the present disclosure may contain an antioxidant having a solubility parameter value of 9 $(J/cm^3)^{1/2}$ to 22 $(J/cm^3)^{1/2}$.

In the case of forming the polyamide layer containing the antioxidant as described above, a phenomenon in which the polymerization of polyamides is decomposed due to an oxidation reaction and a radical decomposition phenomenon may be suppressed to improve oxidation resistance properties under water and in the air.

Specifically, in the case of a polyamide layer containing no antioxidant, when the polyamide layer containing no antioxidant is exposed to a small amount of OH-groups present in water or in atmospheric moisture or is exposed to the atmosphere, radicals may be formed due to light, such that polyamide combinations may be gradually degraded. However, in the case of the polyamide layer containing an antioxidant as described above, since the antioxidant may suppress the radicals from being generated, improvements in oxidation resistance properties may be confirmed.

In addition, the N-chlorination of polyamides may be generated by hypochlorous acid (HOCl) and subsequently, ring-chlorination may be generated by a non-reversible reaction, the Orton rearrangement, such that the polyamide combinations may be gradually degraded. On the other hand, in the case of adding an antioxidant as described above, the antioxidant may suppress the N-chlorination to allow for improvements in chlorine resistance properties.

In this case, the solubility parameter value of the antioxidant according to an exemplary embodiment of the present disclosure may be approximately 9 $(J/cm^3)^{1/2}$ to 22 $(J/cm^3)^{1/2}$, preferably, approximately 12 $(J/cm^3)^{1/2}$ to 20 $(J/cm^3)^{1/2}$.

In general, since the antioxidant may have a significantly low degree of solubility with respect to a solvent and thus, is not readily dissolved therein, and the solubility parameter value of the antioxidant may be varied depending on types thereof. Thus, as can be seen in a manufacturing method to be described below, the organic solvent containing the acyl halide compound may generally be an aliphatic hydrocarbon solvent, and the solvent may have a solubility parameter value of approximately 13 $(J/cm^3)^{1/2}$ to 16 $(J/cm^3)^{1/2}$. Thus, in a case in which the solubility parameter value of the antioxidant does not satisfy the range, the greater part of particles of the antioxidant may not be dissolved in the solvent and accordingly, the particles of the antioxidant may be irregularly formed and agglomerate together in the polyamide layer formed through the interfacial polymerization to thereby be washed at all during a washing process. Consequently, the initial function of the separation membrane may be deteriorated or improvements in oxidation resistance and chlorine resistance properties may be unfeasible.

Meanwhile, throughout the specification, a solubility parameter, a solubility constant of a compound or solvent, refers to the Hansen solubility parameter and may be defined by the Hansen Formula as in the following Formula 1:

$$\delta = \sqrt{\delta_d^2 + \delta_p^2 + \delta_h^2}$$

where, $\delta$=solubility parameter, $\delta_d$=solubility parameter by dispersion force, $\delta_p$=solubility parameter by dipolar intermolecular force, $\delta_h$=solubility parameter by hydrogen bonding force.

In an exemplary embodiment of the present disclosure, the antioxidant may be a primary antioxidant such as a phenol antioxidant or an amine antioxidant; a secondary antioxidant such as a phosphorus antioxidant or a sulfur antioxidant; or combinations thereof.

The phenol antioxidant used in an exemplary embodiment of the present disclosure is not limited to, but may be, for example, 2-t-butyl-6-(3-t-butyl-2-hydroxy-5-methylbenzyl)-4-methylphenyl acrylate, 2-[1-(2-hydroxy-3,5-di-t-pentyl phenyl)ethyl]-4,6-di-t-pentylphenyl acrylate, 1,6-hexanediol bis-[3-(3,5-di-t-butyl-4-hydroxyphenyl) propionate], 2,2-thiodiethylene bis-[3-(3,5-di-t-butyl-4-hydroxyphenyl)propionate], 3,5-di-t-butyl-4-hydroxybenzyl phosphonate diethyl ester, tris(2,6-dimethyl-3-hydroxy-4-t-butylbenzyl)isocyanurate, tris(3,5-di-t-bunyl-4-hydroxybenzyl)isocyanurate, tris[(3,5-di-t-butyl-4-hydroxyphenyl) propionyloxy ethyl]isocyanurate, tris(4-t-butyl-2,6-dimethyl-3-hydroxybenzyl) isocyanurate, 2,2'-methylenebis(4-methyl-6-t-butylphenol) terephthalate, 1,3,5-trimethyl-2,4,6-tris(3,5-di-t-butyl-4-hydroxybenzyl)benzene, 3,9-bis[1,1-dimethyl-2-{β-(3-t-butyl-4-hydroxy-5-methyl-phenyl) propionyloxy}ethyl]-2,4,8,10-tetraoxaspiro[5,5]undecane, 2,2-bis[4-(2-3,5-di-t-butyl-4-hydroxyhydrocinnamoyloxy) ethoxyphenyl]propane, or β-(3,5-di-t-butyl-4-hydroxyphenyl) propionic acid stearyl ester.

Further, the phenol antioxidant may be selected from among compounds represented by the following Chemical Formulae 1 and 2:

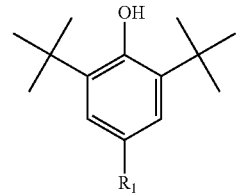

[Chemical Formula 1]

where $R_1$ is a $C_1$ to $C_{20}$ alkyl group;

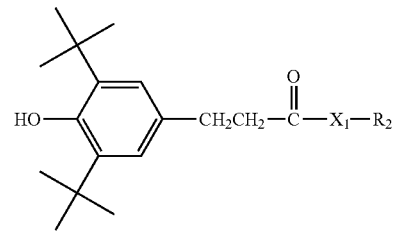

[Chemical Formula 2]

where $R_2$ is a $C_1$ to $C_{20}$ alkyl group,

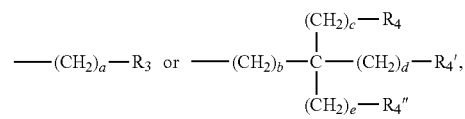

wherein a, b, c, d, and e are each independently an integer of 1 to 10, and $R_3$, $R_4$, $R_4'$ and $R_4''$ are each independently a substance having a structure represented by the following Chemical Formula 3:

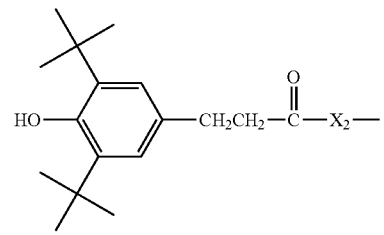

[Chemical Formula 3]

where, $X_1$ and $X_2$ are each independently —O— or —N—.

In this case, it may be preferable in terms of symmetry of compounds, that the a, b, c, d, and e are the same integer of 1 to 10; the $R_3$, $R_4$, $R_4'$ and $R_4''$ have the same structure represented by the following Chemical Formula 3; and the $X_1$ and $X_2$ are both —O— or both —N—.

Meanwhile, the phenol antioxidant may be a commercially available product. Examples of the commercially available phenol antioxidant may include Irganox 1010 [manufactured by Ciba Specialty Chemicals], Irganox 1098 [manufactured by Ciba Specialty Chemicals], Irganox 1076 [manufactured by Ciba Specialty Chemicals], Irganox 1330 [manufactured by Ciba Specialty Chemicals], Irganox 3114 [manufactured by Ciba Specialty Chemicals], Irganox 3125

[manufactured by Ciba Specialty Chemicals], Cyanox 1790 [manufactured by Cytech Products, Inc.], Tinuvin 120 [manufactured by BASF], Tinuvin 326 [manufactured by BASF], Tinuvin 327 [manufactured by BASF], Tinuvin 328 [manufactured by BASF] and the like.

Further, the amine antioxidant used in an exemplary embodiment of the present disclosure is not limited to, but may be, for example, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthyl-amine, a mixture of mono- and dialkylated tert-butyl/tert-octyidiphenylamines, a mixture of mono- and dialkylated nonyl diphenylamine, a mixture of mono- and dialkylated dodecyl diphenyl amine, a mixture of mono- and dialkylated isopropyl/isohexyl-diphenylamine, a mixture of mono- and dialkylated tert-butyldiphenyl, 2,3-dihydro-3,3-dimethyl-4H-1,4-benzothiazine, phenothiazine, a mixture of mono- and dialkylated tert-butyl/tert-octyl phenothiazine, a mixture of mono- and dialkylated tert-octylphenothiazine, N-allyl phenothiazine, N,N,N',N'-tetraphenyl-1,4-diaminobut-2-ene, or the like.

Further, the phosphorus antioxidant used in an exemplary embodiment of the present disclosure is not limited to, but may be, for example, bis(dialkylphenyl)pentaerythritol diphosphite ester, phosphite ester, trioctyl phosphite, trilauryl phosphite, tridecyl phosphite, (octyl)diphenyl phosphite, tris(2,4-di-t-butylphenyl)phosphite, triphenyl phosphite, tris(butoxyethyl)phosphite, tris(nonylphenyl)phosphite, distearyl pentaerythritol diphosphite, tetra(tridecyl)-1,1,3-tris(2-methyl-5-t-butyl-4-hydroxy-phenyl)butane diphosphite, tetra($C_{12}$-$C_{15}$ mixed alkyl)-4,4'-isopropylidenediphenyl diphosphite, tetra(tridecyl)-4,4'-butylidenebis(3-methyl-6-t-bunylphenol)diphosphite, tris(mono- and di-mixed nonylphenyl)phosphite, hydrogenated 4,4'-isopropylidenediphenol polyphosphite, phenyl(4,4'-isopropylidenediphenol)pentaerythritol diphosphite, distearyl pentaerythritol diphosphite, tris[4,4'-isopropylidene-bis(2-t-butylphenol)]phosphite, di(isodecyl)phenyl phosphite, 4,4'-isopropylidenebis(2-t-butylphenol)bis(nonylphenyl)phosphite, bis(2,4-di-t-butyl-6-methylphenyl)ethyl phosphite, 2-[{2,4,8,10-tetra-t-butyldibenz[d,f][1.3.2]-dioxa-phosphepin-6-yl}oxy]-N,N-bis[2-[{2,4,8,10-tetra-t-butyl-dibenz[d,f][1.3.2]dioxaphosphepin-6-yl}oxy]ethyl]-ethaneamine, or 6-[3-(3-t-butyl-4-hydroxy-5-methylphenyl)propoxy]-2,4,8,10-tetra-t-butyldibenz[d,f][1.3.2]-dioxaphosphepin. In particular, the the phosphorus antioxidant used in an exemplary embodiment of the present disclosure may preferably be, bis(dialkylphenyl)pentaerythritol diphosphite ester or phosphite ester.

Meanwhile, the bis(dialkylphenyl)pentaerythritol diphosphite ester may have a spiro-type structure represented by the following Chemical Formula 4 or a cage-type structure represented by the following Chemical Formula 5:

[Chemical Formula 4]

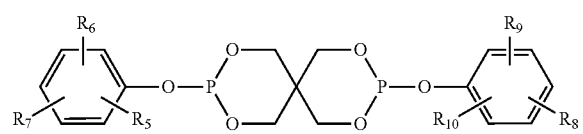

where $R_5$ to $R_{10}$ each independently represents a hydrogen atom or a $C_1$ to $C_9$ alkyl group,

[Chemical Formula 5]

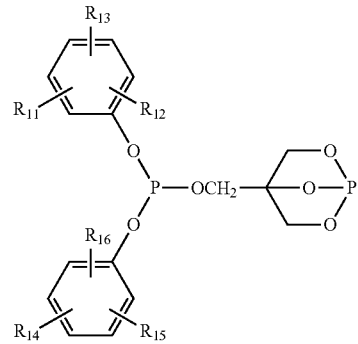

where $R_{11}$ to $R_{16}$ each independently represents a hydrogen atom or a $C_1$ to $C_9$ alkyl group. In a case in which the $R_4$ to $R_9$ each represents the alkyl group, the alkyl group may preferably be a branched alkyl group and thereamong, may be more preferably, a t-butyl group.

Specifically, the bis(dialkylphenyl)pentaerythritol diphosphite ester may be a compound such as bis(2,4-di-t-buthyl-phenyl)pentaerythritol diphosphite, bis(2,6-di-t-butyl-4-methylphenyl)pentaerythritol diphosphite, bis(nonylphenyl)pentaerythritol diphosphite, tetrakis(2,4-di-t-buthylphenyl)-4,4'-biphenylene phosphonate or the like.

Meanwhile, the phosphorus antioxidant may be a commercially available product. Examples of the commercially available phosphorus antioxidant may include Irgafos 168 [manufactured by Ciba Specialty Chemicals], Irgafos 12 [manufactured by Ciba Specialty Chemicals], Irgafos 38 [manufactured by Ciba Specialty Chemicals], ADKSTAB 329K [manufactured by Asahi Denka Kogyo K.K.], ADK STAB PEP36 [manufactured by Asahi Denka Kogyo K.K.], ADK STAB PEP-8 [manufactured by Asahi Denka Kogyo K.K.], Sandstab P-EPQ [manufactured by Clariant, Weston 618 [manufactured by GE], Weston 619G [manufactured by GE], Ultranox 626 [manufactured by GE], and Sumilizer GP [manufactured by SUMITOMO CHEMICAL CO., LTD].

The sulfur antioxidant used in an exemplary embodiment of the present disclosure is not limited to, but may be, for example, dialkyl thiodipropionates such as dilauryl thiodipropionate, dimyristyl thiodipropionate and distearyl thiodipropionate; and polyhydroxy alcohol (e.g., glycerin, trimethylol ethane, trimethylol propane, pentaerythritol or trishydroxyethyl isocyanurate) ester (pentaerythryl tetrakis-3-lauryl thiopropionate) of alkylthiopropionic acids such as butyl thiopropionic acid, octyl thiopropionic acid, lauryl thiopropionic acid and stearyl thiopropionic acid. More specifically, the sulfur antioxidant may be for example, dilauryl thiodipropionate, dimyristyl thiodipropionate, distearyl thiodipropionate, laurylstearyl thiodipropionate, distearyl thiodibutyrate or the like.

Meanwhile, the sulfur antioxidant may be a commercially available product. Examples of the commercially available sulfur antioxidant may include Sumilizer TPS [manufactured by SUMITOMO CHEMICAL CO., LTD], Sumilizer TPL-R [manufactured by SUMITOMO CHEMICAL CO., LTD], Sumilizer TPM [manufactured by SUMITOMO CHEMICAL CO., LTD] or Sumilizer TP-D [manufactured by SUMITOMO CHEMICAL CO., LTD].

The polyamide active layer may be formed by bringing the aqueous solution containing the amine compound into contact with the organic solution containing the acyl halide compound to allow for the interfacial polymerization thereof. The antioxidant may be contained in an amount of approximately 0.02 to 5 parts by weight, preferably approximately 0.05 to 3.5 parts by weight, based on 100 parts by weight of a solid content of the acyl halide compound contained in the organic solution. When the range is satisfied, performance characteristics of the separation membrane such as oxidation resistance and chorine resistance properties may be significantly improved without deterioration in initial salt rejection rate and permeate flux of the separation membrane.

According to the Inventor's experimentation, in the case of a reverse osmosis membrane in which the polyamide layer containing the antioxidant as described above was formed, an initial salt rejection rate of 99.00% or more and an initial permeate flux of 28.0 gallon/ft$^2$·day or more may be achieved, which were identical to or superior than those of a reverse osmosis membrane according to the related art. In addition, even after the membrane was immersed in de-ionized water and was subsequently stored for 14 days, the salt rejection rate was 99.10% or more, preferably 99.20% or more, and the permeate flux was about 28 to 35 gallon/ft$^2$·day. Further, even after the membrane was stored for 16 days under light tight conditions, the salt rejection rate was 98.50% or more, preferably 99.00% or more, more preferably, 99.20% or more, and the permeate flux was about 30.0 to 39.0 gallon/ft$^2$·day, demonstrating that water purifying functions were not remarkably degraded.

Furthermore, after 12 hours had elapsed subsequently to the introduction of a mixed aqueous solution containing sodium chloride (NaCl) at a concentration of 32,000 ppm and sodium hypochlorite (NaOCl) at a concentration of 2,000 ppm to the water-treatment separation membrane under pressure conditions of 800 psi, the salt rejection rate was 98.50% or more, preferably 99.00% or more, more preferably, 99.20% or more, and the permeate flux was about 25.0 to 35.0 gallon/ft$^2$·day, demonstrating that water purifying functions were not remarkably degraded.

More specifically, after 12 hours had elapsed subsequently to the introduction of a mixed aqueous solution containing sodium chloride (NaCl) at a concentration of 32,000 ppm and sodium hypochlorite (NaOCl) at a concentration of 2,000 ppm to the water-treatment separation membrane under pressure conditions of 800 psi, variations in a salt rejection rate of the water-treatment separation membrane were 0.5% or less, preferably, 0.2% or less or 0.1% or more, as compared to the initial salt rejection rate.

In a similar manner, after 12 hours had elapsed subsequently to the introduction of a mixed aqueous solution containing the sodium hypochlorite (NaOCl) under the same condition as that described above to the water-treatment separation membrane under pressure conditions of 800 psi, variations in a permeate flux of the water-treatment separation membrane were 10% or less, preferably, 5% or less or 3% or more, as compared to the initial permeate flux rate.

That is, the water-treatment separation membrane according to an exemplary embodiment of the present disclosure may have significantly superior degrees of oxidation resistance and chorine resistance properties.

The water-treatment separation membrane including the constitutions may be used in a micro-filtration method, an ultra-filtration method, a nano-filtration method, or a reverse osmosis method, and may preferably be used in the reverse osmosis method.

In addition, according to an exemplary embodiment of the present disclosure, a water-treatment module including at least one water-treatment separation membrane according to the foregoing exemplary embodiment of the present disclosure as described above may be provided.

Specific types of the water-treatment module according to the exemplary embodiment of the present disclosure are not particularly limited; however, examples thereof may include plate and frame modules, a tubular module, hollow and fiber modules, a spiral wound module and the like. Moreover, as long as the water-treatment module according to an exemplary embodiment of the present disclosure includes the water-treatment separation membrane according to the foregoing exemplary embodiment, other configurations and manufacturing methods and the like are not particularly limited, and general methods and elements commonly known in the art may be employed without limitations.

Meanwhile, since the water-treatment module according to an exemplary embodiment of the present disclosure may have superior oxidation resistance and contamination resistance properties and may be chemically stable, it may be usefully used in a water-treatment device such as a domestic/industrial water-purifying device, a sewage treatment device, a seawater-fresh water-treatment device or the like.

Next, a method of manufacturing a water-treatment separation membrane according to an exemplary embodiment of the present disclosure will be described.

More specifically, the method of manufacturing a water-treatment separation membrane according to an exemplary embodiment of the present disclosure may include: forming an aqueous solution layer containing an amine compound on a porous support; and forming a polyamide layer by bringing an organic solution containing an acyl halide compound and an antioxidant having a solubility parameter value of 9 $(J/cm^3)^{1/2}$ to 22 $(J/cm^3)^{1/2}$ into contact with the aqueous solution layer.

In the forming of the aqueous solution layer containing the amine compound, as the amine compound, amine compounds capable of being used in manufacturing the water-treatment separation membrane may be used without limitations. For example, the amine compound may be an aromatic polyfunctional amine such as cyclohexane diamine, piperazine, piperazine derivatives or the like; N, N-dimethyl-1,3-phenylene diamine, xylene diamine, benzidine, benzidine derivatives or combinations thereof. Among these, the amine compound may preferably be an aromatic polyfunctional amine and may be for example, m-phenylenediamine, p-phenylenediamine, 1,3,6-benzene triamine, 4-chloro-1,3-phenylenediamine, 6-chloro-1,3-phenylenediamine, 3-chloro-1,4-phenylenediamine or combinations thereof.

Meanwhile, a solvent of the aqueous amine solution may be a polar solvent such as water, and if necessary, additives such as triethylamine and camphor sulfonic acid may be further added to the aqueous amine solution.

In addition, any method of forming the amine aqueous solution layer on the porous support may be included, as long as it may form an aqueous solution on a support. For example, any method such as a spraying method, a coating method, a dipping method, a dropping method or the like may be usable.

After the aqueous solution layer is formed, a process of removing an excessive amount of the aqueous solution containing the amine compound may be selectively further performed on the layer. In a case in which an excessive amount of the aqueous solution is removed, an interfacial polymerization layer may be stably formed on the support to form a uniform layer. The excessive amount of the aqueous solution may be removed by a sponge, an air knife, nitrogen-gas blowing, natural drying, a pressing roll or the like. The removal method is not limited thereto.

When the amine aqueous solution layer is formed on the porous support through the processes as described above, the organic solution containing the acyl halide compound and the antioxidant having a solubility parameter value of 9 $(J/CM^3)^{1/2}$ to 22 $(J/cm^3)^{1/2}$ comes into contact with the amine aqueous solution layer to form the polyamide layer.

In this case, the amine compound coated on a surface of the support and the acyl halide compound react with each other to generate polyamides through the interfacial polymerization therebetween, and the polyamides may be adsorbed onto the micro-porous support to form a thin film. In the contact method, the polyamide layer may be formed by a dipping method, a spraying method, a coating method or the like.

The acyl halide compound, an aromatic compound having two to three carboxylic acid halides, is not limited to, but may be trimesoyl chloride, isophthaloyl chloride, terephthaloyl chloride or a mixture thereof.

Meanwhile, since a description of the antioxidant is identical to that as described above, a detailed description thereof will be omitted.

Meanwhile, the organic solvent containing the acyl halide compound may be a solvent that neither participates in the interfacial polymerization reaction nor causes a chemical combination with the acyl halide compound as well as not causing damage to the porous support layer. As the organic solvent, an aliphatic hydrocarbon solvent, for example, freon, and a hydrophobic liquid unmixed with water such as hexane having 5 to 12 carbon atoms, cyclohexane, heptane or alkane, for example, alkane having 5 to 12 carbon atoms and mixtures thereof such as Isol-C (by Exxon Cor.), Isol-G (by Exxon Cor.) or the like may be used.

In this case, the acyl halide compound may be contained in an amount of 0.05 to 1 wt % based on the total of the organic solvent. In a case in which the content of the acyl halide compound is within the range, superior salt rejection rate and permeate flux characteristics may be obtained.

Meanwhile, the antioxidant may be contained in an amount of approximately 0.02 to 5 parts by weight, preferably approximately 0.05 to 3.5 parts by weight, based on 100 parts by weight of a solid content of the acyl halide compound contained in the organic solution. When the content of the antioxidant exceeds the range, water molecules as well as salts may not pass through the separation membrane due to effects of blocking fine pores within a polyamide polymer, whereby the permeate flux and initial performance values of the separation membrane may be significantly lowered. In a case in which the content of the antioxidant is below the range, it may be difficult to expect oxidation resistance and chlorine resistance effects.

In addition, time required for the contact process may be approximately 1 minute to 5 hours, preferably, approximately 1 minute to 3 hours. In a case in which the contact time is less than 1 minute, a coating layer may be insufficiently formed. In a case in which the contact time exceeds 5 hours, a thickness of the coating layer may be excessively large to cause negative influences such as a reduction in the permeate flux of the water-treatment separation membrane.

Meanwhile, when the polyamide layer is formed on the porous support through the processes as described above, drying and cleaning processes may be selectively performed. In this case, the drying process may be performed for approximately 1 to 10 minutes at an oven at a temperature of 45° C. to 80° C. In addition, the cleaning process is not particularly limited, but may be performed in an alkaline aqueous solution, for example. A usable alkaline aqueous solution is not particularly limited but may be an aqueous sodium carbonate solution. Specifically, the cleaning process may be performed in the aqueous sodium carbonate solution at a temperature of 20° C. to 30° C. for 1 to 24 hours.

MODE FOR DISCLOSURE

Inventive Example 1

18 wt % of a polysulfone solid was added to a DMF (N,N-dimethylformamide) solution and dissolved therein at a temperature of 80° C. to 85° C. for 12 or more hours to obtain a homogeneous liquid phase. The solution having the homogeneous liquid phase was cast on a non-woven fabric formed of a polyester material and having a thickness of 95 to 100 μm, at a thickness of 45 to 50 μm. Then, the cast non-woven fabric was placed in water to form a porous polysulfone support.

After the porous polysulfone support manufactured by the method described above was dipped in an aqueous solution containing 2 wt % of m-phenylene diamine, 1 wt % of triethylamine, and 2.3 wt % of camphor sulfonic acid for 2 minutes, an excessive amount of the aqueous solution on the support was removed therefrom using a roller under 25 psi of pressure and the porous polysulfone support was then dried for 1 minute at room temperature.

Thereafter, an organic solution containing 0.2% by volume of trimesoyl chloride (TMC) and containing, as an antioxidant, 2 parts by weight of Irganox1010 (Pentaerythritol tetrakis(3-(3,5-di-tert-butyl-4-hydroxyphenyl)propionate), solubility parameter: 18.5 $(J/cm^3)^{1/2}$) based on 100 parts by weight of a solid content of the trimesoyl chloride (TMC) in a Hexane solvent (manufactured by Sigma Aldrich) was coated on a surface of the coated support to conduct an interfacial polymerization reaction.

After a water-treatment separation membrane obtained by the method as described above was immersed in 0.2 wt % of an aqueous sodium carbonate solution for two or more hours and then washed with distilled water for 1 minute, a water-treatment separation membrane including a polyamide layer was manufactured.

Inventive Example 2

A water-treatment separation membrane was manufactured using the same method as that of Inventive Example 1, with the exception that 2 parts by weight of Irganox1098 (N,N'-hexane-1,6-diylbis(3-(3,5-di-tert-butyl-4-hydroxyphenylpropionamide)), solubility parameter: 19.8 $(J/cm^3)^{1/2}$) based on 100 parts by weight of the solid content of the trimesoyl chloride (TMC) was used as the antioxidant.

Inventive Example 3

A water-treatment separation membrane was manufactured using the same method as that of Inventive Example 1, with the exception that 2 parts by weight of PEP36 (N,N'-hexane-1,6-diylbis(3-(3,5-di-tert-butyl-4-hydroxyphenyl-propionamide)), solubility parameter: 19.0 $(J/cm^3)^{1/2}$) based on 100 parts by weight of the solid content of the trimesoyl chloride (TMC) was used as the antioxidant.

Inventive Example 4

A water-treatment separation membrane was manufactured using the same method as that of Inventive Example 1, with the exception that 1 part by weight of Irganox1098 and 1 part by weight of PEP36 based on 100 parts by weight of the solid content of the trimesoyl chloride (TMC) were used as the antioxidant.

Inventive Example 5

A water-treatment separation membrane was manufactured using the same method as that of Inventive Example 1, with the exception that 1 part by weight of Irganox1010 based on 100 parts by weight of the solid content of the trimesoyl chloride (TMC) was used as the antioxidant.

Inventive Example 6

A water-treatment separation membrane was manufactured using the same method as that of Inventive Example 1, with the exception that 3 parts by weight of Irganox1010 based on 100 parts by weight of the solid content of the trimesoyl chloride (TMC) was used as the antioxidant.

Comparative Example 1

A water-treatment separation membrane was manufactured using the same method as that of Inventive Example 1, with the exception that the organic solution contained only 0.2% by volume of trimesoyl chloride (TMC) without the antioxidant at the time of manufacturing the organic solution.

Comparative Example 2

A water-treatment separation membrane was manufactured using the same method as that of Inventive Example 1, with the exception that 2 parts by weight of BHA (butylated hydroxyanisole, solubility parameter: 25.4 $(J/cm^3)^{1/2}$) based on 100 parts by weight of the solid content of the trimesoyl chloride (TMC) was used as the antioxidant.

Comparative Example 3

A water-treatment separation membrane was manufactured using the same method as that of Inventive Example 1, with the exception that 15 parts by weight of Irganox1010 based on 100 parts by weight of the solid content of the trimesoyl chloride (TMC) was used as the antioxidant.

Experimental Example 1—Measurement of Initial Salt Rejection Rates and Initial Permeate Fluxes Initial salt rejection rates and Initial permeate fluxes were estimated with respect to the water-treatment separation membranes manufactured according to the Inventive Examples 1 to 6 and Comparative Examples 1 to 3, using the following method. The initial salt rejection rates and the initial permeate fluxes were measured while 32,000 ppm of an aqueous sodium chloride (NaCl) solution was supplied with a flux of 4500 mL/min at a temperature of 25° C. A water-treatment separation membrane cell apparatus used in membrane evaluation included a flat panel type permeation cell, a high pressure pump, a reservoir, and a cooling device. The flat panel type permeation cell had a cross-flow structure and an effective permeation area thereof was 28 $cm^2$. After each water-treatment separation membrane that had been washed was installed on the permeation cell, a preliminary operation was sufficiently conducted, using tertiary distilled water for about 1 hour in order to stabilize the evaluation equipment. Next, after the tertiary distilled water was substituted with 32,000 ppm of an aqueous sodium chloride (NaCl) solution and an equipment operation was conducted for about 1 hour until pressure and permeate flux reached a normal state, an amount of water permeated for 10 minutes was measured to calculate the flux, and salt concentrations before and after the permeation were analyzed using a conductivity meter to calculate the initial salt rejection rate. The measurement results are shown in the following [Table 1].

Experimental Example 2—Measurement of Oxidation Resistance Over Time

Oxidation resistance properties were estimated with respect to the water-treatment separation membranes manufactured according to the Inventive Examples 1 to 6 and Comparative Examples 1 to 3, using the following method. After the initial salt rejection rates and the initial permeate fluxes were measured in 32,000 ppm of an aqueous sodium chloride (NaCl) solution under a pressure of 800 psi, a portion of the separation membranes was evaluated the following day after the manufacturing thereof, while another portion of the separation membranes was immersed in de-ionized water and stored for 14 days, and subsequently, salt rejection rates and permeate fluxes thereof were measured by the method as described above. In addition, the remaining portion of the manufactured separation membranes was stored in a light-tight container for 8 days and 16 days, and subsequently, salt rejection rates and permeate fluxes thereof were measured. The measured results are shown in the following [Table 1].

TABLE 1

|  | Types and Contents of Antioxidant | Following Day Evaluation | | Evaluation after being DIW stored for 14 days | | Evaluation after being stored in light-tight container for 8 days | | Evaluation after being stored in light-tight container for 16 days | |
| --- | --- | --- | --- | --- | --- | --- | --- | --- | --- |
|  | (Parts by weight based on solid content of TMC) | Salt Rejection Rate (%) | Permeate Flux (GFD) | Salt Rejection Rate (%) | Permeate Flux (GFD) | Salt Rejection Rate (%) | Permeate Flux (GFD) | Salt Rejection Rate (%) | Permeate Flux (GFD) |
| Inventive Example 1 | Irganox 1010 (2) | 99.53 | 31.92 | 99.43 | 30.87 | 99.40 | 35.71 | 99.34 | 36.53 |
| Inventive Example 2 | Irganox 1098 (2) | 99.48 | 31.81 | 99.37 | 29.69 | 99.36 | 35.94 | 99.29 | 37.12 |
| Inventive Example 3 | PEP36 (2) | 99.55 | 30.35 | 99.27 | 29.52 | 99.15 | 34.06 | 98.98 | 38.81 |
| Inventive Example 4 | Irganox 1098(1) + PEP36(1) | 99.46 | 29.82 | 99.27 | 31.58 | 99.31 | 33.47 | 99.27 | 34.18 |
| Inventive Example 5 | Irganox 1010(1) | 99.50 | 31.99 | 99.28 | 33.72 | 99.39 | 31.99 | 99.29 | 35.91 |

TABLE 1-continued

| | Types and Contents of Antioxidant | Following Day Evaluation | | Evaluation after being DIW stored for 14 days | | Evaluation after being stored in light-tight container for 8 days | | Evaluation after being stored in light-tight container for 16 days | |
|---|---|---|---|---|---|---|---|---|---|
| | (Parts by weight based on solid content of TMC) | Salt Rejection Rate (%) | Permeate Flux (GFD) | Salt Rejection Rate (%) | Permeate Flux (GFD) | Salt Rejection Rate (%) | Permeate Flux (GFD) | Salt Rejection Rate (%) | Permeate Flux (GFD) |
| Inventive Example 6 | Irganox 1010(3) | 99.53 | 31.01 | 99.50 | 31.86 | 99.42 | 31.00 | 99.38 | 33.78 |
| Comparative Example 1 | — | 99.46 | 33.35 | 99.04 | 35.12 | 99.01 | 34.88 | 98.34 | 35.35 |
| Comparative Example 2 | BHA(2) | 87.42 | 22.89 | — | — | — | — | — | — |
| Comparative Example 3 | Irganox 1010(15) | 99.54 | 7.21 | 99.52 | 7.55 | 99.42 | 9.66 | 99.40 | 10.02 |

Referring to the results of [Table 1], in a case in which the antioxidant was contained in an amount as in the Inventive Examples 1 to 6, it could be confirmed that degrees of decline in salt rejection rates were significantly low as compared to the case of the separation membranes of Comparative Example 1, such that oxidation resistance properties were improved. However, as can be seen in Comparative Example 2, in a case in which an antioxidant that did not satisfy the range of solubility parameter according to the exemplary embodiment of the present disclosure was used, it could be confirmed that the salt rejection rates and the permeate fluxes were remarkably deteriorated. As can be seen in Comparative Example 3, in a case in which the antioxidant was contained in an amount of 15 parts by weight based on 100 parts by weight of the solid content of the acyl halide compound, it could be confirmed that the initial permeate fluxes were significantly low, such that it may be difficult to use the membrane according to the Comparative Example 3 as a separation membrane.

Experimental Example 3—Measurement of Chlorine Resistance Over Time

Chlorine resistance properties were estimated with respect to the water-treatment separation membranes manufactured according to the Inventive Examples 1 to 2 and Comparative Example 1. After initial salt rejection rates and initial permeate fluxes were measured under a pressure of 800 psi, using an aqueous mixed solution containing 32,000 ppm of an aqueous sodium chloride (NaCl) solution and 2,000 ppm of sodium hypochlorite (NaOCl), salt rejection rates and permeate fluxes were measured after 12 hours were elapsed subsequently to the measurement. Variations in the salt rejection rates and permeate fluxes after the lapse of 12 hours as compared to the initial salt rejection rates and initial permeate fluxes were measured. The measured results are shown in the following [Table 2].

TABLE 2

| Classification | Salt Rejection Rate (%) | | Permeate Flux (GFD) | | Variation (%) | |
|---|---|---|---|---|---|---|
| | Immediately after introduction of NaOCl | After 12 hours elapsed subsequently to exposure to NaOCl | Immediately after introduction of NaOCl | After 12 hours elapsed subsequently to exposure to NaOCl | Salt rejection rate after exposure for 12 hours | Permeate Flux after exposure for 12 hours |
| Inventive Example 1 | 99.57 | 99.50 | 34.18 | 33.82 | 0.07 | 1.05 |
| Inventive Example 2 | 99.45 | 99.43 | 30.76 | 30.77 | 0.02 | 0.33 |
| Comparative Example 1 | 99.44 | 98.12 | 32.29 | 38.22 | 1.33 | 18.36 |

Referring to the results of [Table 2], it could be confirmed that the salt rejection rates and the permeate fluxes of the Inventive Examples 1 to 2 had no remark variations even after the exposure to NaOCl for 12 hours. Thus, as compared to the Comparative Example 1 in which the salt rejection rate was decreased by about 1.33% and the permeate flux was sharply increased during the same period of time, it could be confirmed that superior chlorine resistance properties were exhibited in the case of the Inventive Examples 1 to 2.

While the present disclosure has been shown and described in connection with the embodiments, it will be apparent to those skilled in the art that modifications and variations can be made without departing from the spirit and scope of the disclosure as defined by the appended claims.

What is claimed:

1. A water-treatment separation membrane comprising:
   a porous support; and
   a polyamide layer formed on the porous support,
   wherein the polyamide layer contains an antioxidant having a solubility parameter value of 9 $(J/cm^3)^{1/2}$ to 22 $(J/cm^3)^{1/2}$, wherein:
   the antioxidant is a phenol antioxidant of Chemical Formula 2:

[Chemical Formula 2]

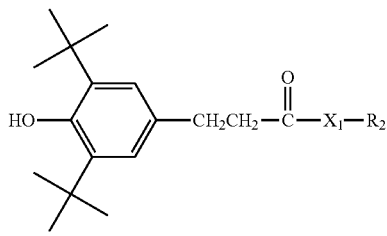

wherein $R_2$ is:

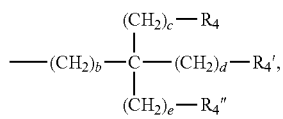

wherein a, b, c, d, and e each independently is an integer of 1 to 10, $X_1$ is —N—, and $R_4$, $R_4'$ and $R_4''$ each independently has a structure of Chemical Formula 3:

[Chemical Formula 3]

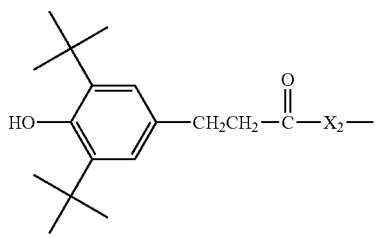

wherein $X_2$ is —N—.

2. The water-treatment separation membrane of claim 1, wherein the polyamide active layer is formed by bringing an aqueous solution containing an amine compound into contact with an organic solution containing an acyl halide compound to allow for an interfacial polymerization, and the antioxidant is contained in an amount of 0.02 to 5 parts by weight based on 100 parts by weight of a solid content of the acyl halide compound contained in the organic solution.

3. The water-treatment separation membrane of claim 1, wherein a salt rejection rate of the water-treatment separation membrane after being immersed in de-ionized water for 14 days is 99.10% or more.

4. The water-treatment separation membrane of claim 1, wherein a salt rejection rate of the water-treatment separation membrane after being stored under light-tight conditions for 16 days is 98.50% or more.

5. The water-treatment separation membrane of claim 1, wherein a salt rejection rate of the water-treatment separation membrane after allowing a mixed aqueous solution containing an aqueous sodium chloride solution at a concentration of 32,000 ppm and sodium hypochlorite at a concentration of 2,000 ppm to pass through the water-treatment separation membrane for 12 hours is 98.50% or more.

6. The water-treatment separation membrane of claim 1, wherein variations in a salt rejection rate of the water-treatment separation membrane after allowing a mixed aqueous solution containing an aqueous sodium chloride solution at a concentration of 32,000 ppm and sodium hypochlorite at a concentration of 2,000 ppm to pass through the water-treatment separation membrane for 12 hours are 0.5% or less, as compared to an initial salt rejection rate of the water-treatment separation membrane.

7. The water-treatment separation membrane of claim 1, wherein variations in a permeate flux of the water-treatment separation membrane after allowing a mixed aqueous solution containing an aqueous sodium chloride solution at a concentration of 32,000 ppm and sodium hypochlorite at a concentration of 2,000 ppm to pass through the water-treatment separation membrane for 12 hours are 10% or less, as compared to an initial permeate flux of the water-treatment separation membrane.

8. A water-treatment module comprising the water-treatment separation membrane of claim 1.

9. A water-treatment device comprising the water-treatment module of claim 8.

10. A method of manufacturing a water-treatment separation membrane, the method comprising:

forming an aqueous solution layer containing an amine compound on a porous support; and forming a polyamide layer by bringing an organic solution containing an acyl halide compound and an antioxidant having a solubility parameter value of 9 $(J/cm^3)^{1/2}$ to 22 $(J/cm^3)^{1/2}$ into contact with the aqueous solution layer, wherein:

the antioxidant is present in an amount of 0.02 to 5 parts by weight based on 100 parts by weight of a solid content of the acyl halide compound contained in the organic solution; and the antioxidant is a phenol antioxidant of Chemical Formula 2:

[Chemical Formula 2]

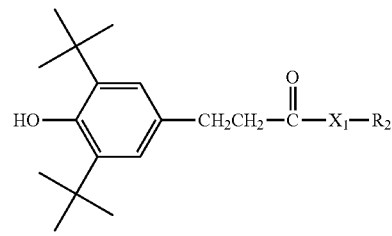

wherein $R_2$ is:

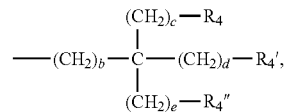

wherein a, b, c, d, and e each independently is an integer of 1 to 10, $X_1$ is —N—, and $R_4$, $R_4'$ and $R_4''$ each independently has a structure of Chemical Formula 3:

[Chemical Formula 3]
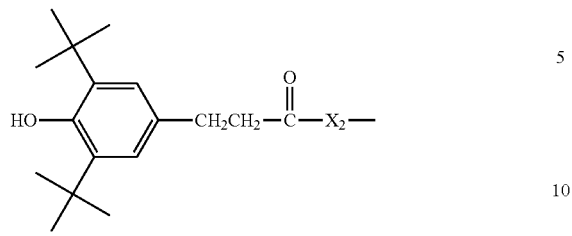
wherein $X_2$ is —N—.
* * * * *